United States Patent
Cheiky et al.

(10) Patent No.: US 6,489,054 B2
(45) Date of Patent: Dec. 3, 2002

(54) BATTERY CASE WITH EDGE SEAL

(75) Inventors: Michael Cheiky, Santa Barbara, CA (US); Glen Robles, Santa Barbara, CA (US)

(73) Assignee: Zinc Matrix Power, Inc., Santa Barbara, CA (US)

(*) Notice: Subject to any disclaimer, the term of this patent is extended or adjusted under 35 U.S.C. 154(b) by 35 days.

(21) Appl. No.: 09/839,326

(22) Filed: Apr. 19, 2001

(65) Prior Publication Data

US 2002/0155349 A1 Oct. 24, 2002

(51) Int. Cl.⁷ ................. H01M 2/02; H01M 2/08; H01M 2/14; H01M 10/28
(52) U.S. Cl. .............. 429/185; 429/144; 429/162; 429/163; 429/255; 29/623.2
(58) Field of Search ............... 429/142, 144, 429/162, 163, 174, 185, 206, 219, 229, 249, 255; 29/623.2

(56) References Cited

U.S. PATENT DOCUMENTS

| | | |
|---|---|---|
| 3,708,343 A | 1/1973 | Walsh |
| 4,121,021 A | 10/1978 | Ogawa et al. |
| 4,172,183 A | 10/1979 | Ruetschi |
| 4,209,574 A | 6/1980 | Ruetschi |
| 5,198,314 A | 3/1993 | Gordy |
| 5,272,020 A | 12/1993 | Flack |
| 5,462,819 A | 10/1995 | Jacus et al. |
| 5,725,967 A * | 3/1998 | Tuttle ................. 429/171 |
| 6,086,643 A * | 7/2000 | Clark et al. ........... 29/623.1 |
| 6,099,987 A | 8/2000 | Daniel-Ivad et al. |
| 2002/0031704 A1 * | 3/2002 | Okahisa et al. ......... 429/162 |

FOREIGN PATENT DOCUMENTS

JP 60-241641 * 11/1985

* cited by examiner

Primary Examiner—Patrick Ryan
Assistant Examiner—Jonathan Crepeau
(74) Attorney, Agent, or Firm—Marvin E. Jacobs

(57) ABSTRACT

A battery case for a battery containing swellable cellulose separators including case members having opposed undulating mating surfaces and a rim and groove sized to space the surfaces a predetermined distance apart to form a gripping channel such that the outer portion of a stack of dry separators occupies at least 80% but no more than 98% of said channel. On injecting liquid electrolyte into the case, the separators swell and are securely gripped by said undulations and mating surface.

13 Claims, 3 Drawing Sheets

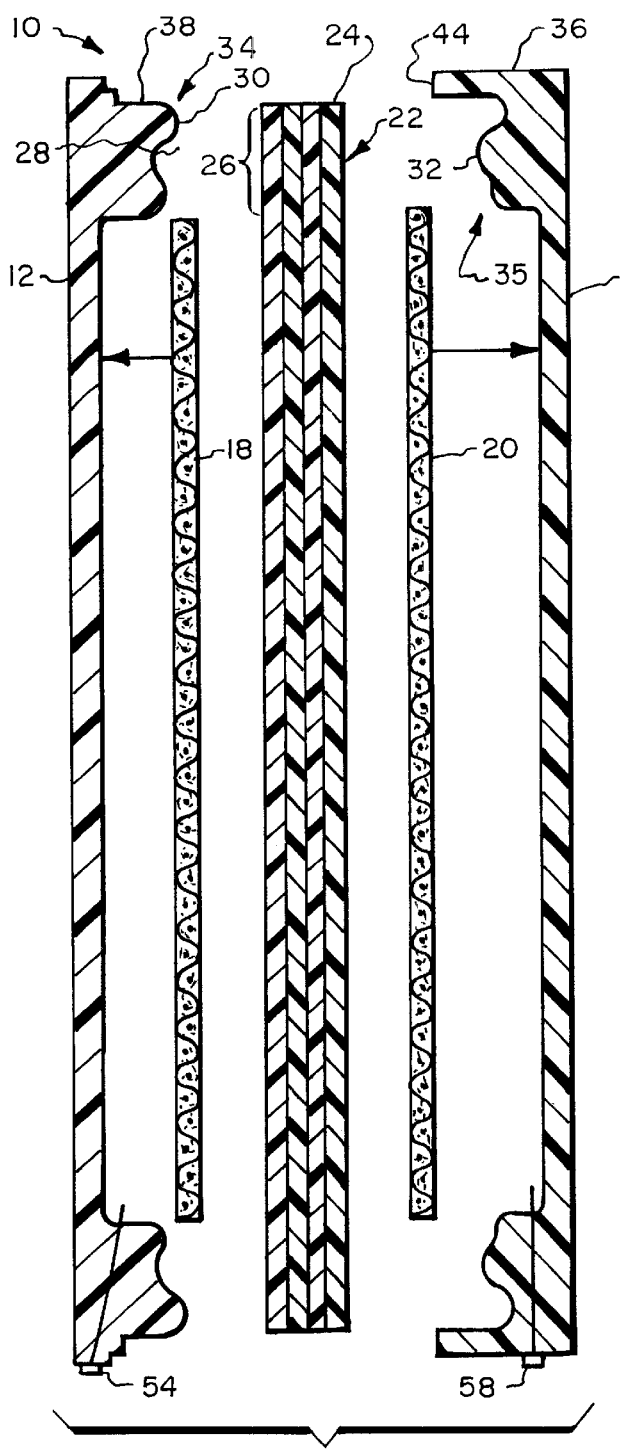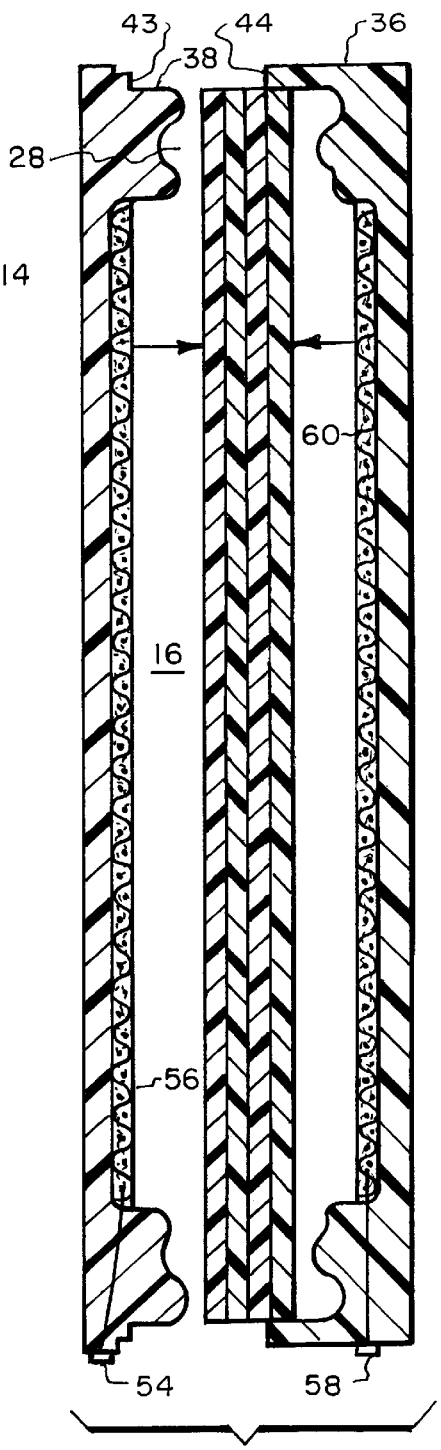
*Fig. 1.*   *Fig. 2.*

BATTERY CASE WITH EDGE SEAL

TECHNICAL FIELD

The present invention relates to electric storage batteries and, more particularly, this invention relates to an edge seal for a battery case containing swellable separators.

BACKGROUND OF THE INVENTION

Proper operation of a battery requires electrical insulation between the positive and negative electrodes of a battery. If there is a slightest breach, the battery will discharge or will slowly short out with resultant premature loss of capacity. Separators are utilized to separate the electrodes. A battery assembly containing the edges of the separator must mate properly with case components in order to form a seal that insulates mass flow between different electrode compartments. Typically the case components tend to be either stainless steel cans, though increasingly these components can be made of nonmetal materials such as durable plastics. Separator materials tend to be regenerated cellulose or semi-porous polyolefin films modified to be ionically conducting. Thus the need arises of sealing polymer separator to either a metal housing or a plastic housing.

LIST OF REFERENCES

U.S. Pat. No. 5,057,385, Hope et al.
U.S. Pat. No. 4,209,574, Ruetschi.
U.S. Pat. No. 4,172,183, Ruetschi.
U.S. Pat. No. 4,121,021, Ogawa et al.
U.S. Pat. No. 3,884,723, Wuttke.
U.S. Pat. No. 3,708,343, Walsh.
U.S. Pat. No. 3,489,616, Fangradt et al.

STATEMENT OF THE PRIOR ART

U.S. Pat. Nos. 5,272,020 uses a hot melt thermoplastic sealant at the bottom edge zone of the separator system which impregnates the separator system at the edges zone. U.S. Pat. No. 5,462,819 discloses a hot melt material which is metered into the cell so that the hot melted material flows under the bottom edge of the separator, which is then pushed down and seated in the hot melt material as it cools. The end result is a barrier which forms at the bottom of the cell and at both sides of the separator. U.S. Pat. No. 6,099,987 communicates a cup seal made of micro-porous or non-porous membrane, attached to the bottom with a small amount of hot sealant, with the aim of minimizing the amount of hot-sealant used in the seal.

In U.S. Pat. No. 4,209,574 and 4,172,183 Ruetschi designs a metal case that pushes against separators which are then pushed into a sealing ring made of nylon, neoprene or teflon. Ogawa et al. in U.S. Pat. No. 4,121,021 demonstrate a metal case pushing on an annular gasket, which in turn compresses the separators. Walsh in U.S. Pat. No. 3,708,343 has the top of the battery compressing on a grommet, and in this state the battery is sealed with epoxy. Gordy in U.S. Pat. No. 5,198,314 uses polyphenelyne sulfide as seal material.

As mentioned in U.S. Pat. No. 6,099,987 hot-melt sealants diminish the capacity of the battery and lower the volumetric density. In our invention we avoid the use of hot-melt sealants altogether by relying on a mechanism where the battery seals itself. In our invention we also do not rely on applying direct compressional force on the separators to effect a seal. Rather we rely on the swelling properties of cellulose in the presence of an alkali hydroxide to provide a tight seal between the two battery compartments.

Cellulose in the form of cellophane has been a widely used separator for a variety of alkaline batteries. The reasons include its low electrical impedance as well as excellent ion transport in alkaline environments. Cellulose-alkali hydroxide interactions in aqueous solutions are known to be strong and asymmetrical. Swelling of cellulose material in the presence of alkali hydroxides occurs on a time scale of seconds to minutes. The swelling power depends on the alkali hydroxide concentration, with a pronounced change in the X-ray lattice dimensions above a certain lye concentration. It also depends on the cellulose starting material. For cellophane, a 1 mil thick film swells to at least 2 times its original thickness when exposed to an aqueous potassium hydroxide solution (50% by weight) for more than a few seconds.

SUMMARY OF THE INVENTION

A battery seal is disclosed whereby a cellulose-based separator or separators, placed between undulating matching edges of a mating case halves suitably made of thermoplastic resin and occupying, in dry form, at least 80% of available edge space, swells by at least 20% from its dry thickness in the presence of an alkali-hydroxide of specific gravity 1.25 to 1.45 and thus generates a tight seal insulating the electrode compartments of the battery.

STATEMENT OF THE INVENTION

The edge sealing system according to the invention utilizes the profile of the edges of 2 mating casing members to grip and seal the swellable separators. One edge is formed to contain at least 2 convex undulations. The edge of the opposed casing members contains the same number of mating concave grooves. Spacing means are present to space the convex undulations from the grooves an amount at least equal to the thickness of the edges of a stack of swellable separators in the dry state. Typically, the dry thickness of the separators occupy from at least 80% but no more than 98%, preferably 90–95% of the space between the undulations and the grooves. When the separators absorb electrolyte they expand and are locked between the mating surfaces. The undulations are preferably rounded to prevent cutting or tearing the separators.

The outer edge of the space must be sealed to prevent leakage of electrolyte from the battery case. A preferred method of sealing the edge is to form a rim on the outer edge of one half of the case which projects across the outer opening of the space that grips the edges of the separators. The opposed case member has a groove that receives the rim. The length of the groove is less than that of the rim, a predetermined distance forming a limit or stop that defines the thickness of the separator gripping space. A recess can be formed at the junction of the rim and groove to receive a sealant or potting material such as an epoxy. The electrolyte is injected into the separators after the recess is sealed.

The expanded separators are reliably gripped by the undersized channel. The rounded undulations firmly grip the edges of the separators without ripping, puncturing or tearing the separators. The rim and grooves seal the channel and simultaneously space the edges a fixed distance apart. The casing is readily manufactured by molding of resin materials at moderate cost.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 1 is an exploded, cross-section view of the case and battery components in accordance with the invention;

FIG. 2 is a further exploded view in section illustrating outer edge of a stack of separators entering a channel between undulating surfaces;

DETAILED DESCRIPTION OF THE INVENTION

Figure 3:
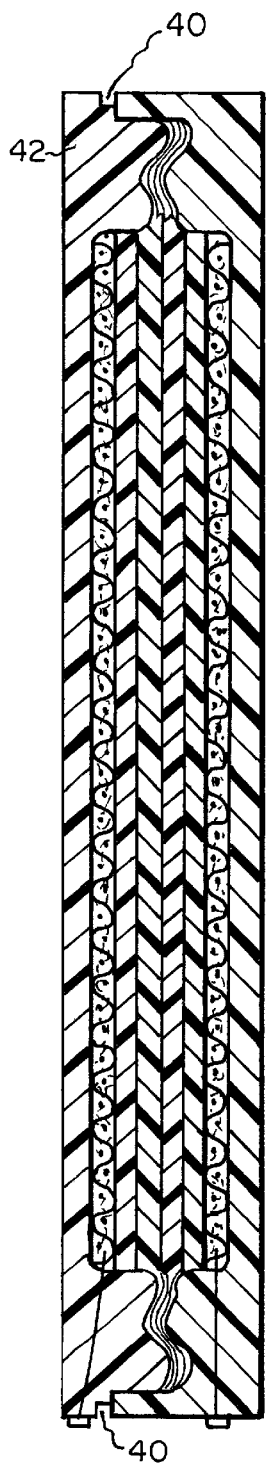
FIG. 3 is a view in section of the assembled battery.

Referring now to FIGS. 1–5, a battery 10 according to the invention includes a first case member 12 and a second case member 14 defining a compartment 16 for receiving an anode 18, a cathode 20 and a stack 22 of separators 24. The separators 24 are larger then the compartment 16 forming an outer portion 26 which is received in a channel 28 formed between the undulating mating surfaces 30, 32 formed on the inner portions of the mating edges 34, 35 of the case members 12, 14. The channel 28 has a fixed separation of no less than the thickness of the stack 22 of dry separators 24. Usually the dry separators occupy at least 80%, suitably 90–95% of the channel 28. The anode can contain zinc and the cathode can contain silver.

The channel 28 is closed by an outer rim 36 formed on one of the case members which seats into an opposed groove 38 in the other case member 12 or 14. The length of the groove 38 is less than the length of the rim 36 by an amount equal to the width of the channel 28.

Figure 4:
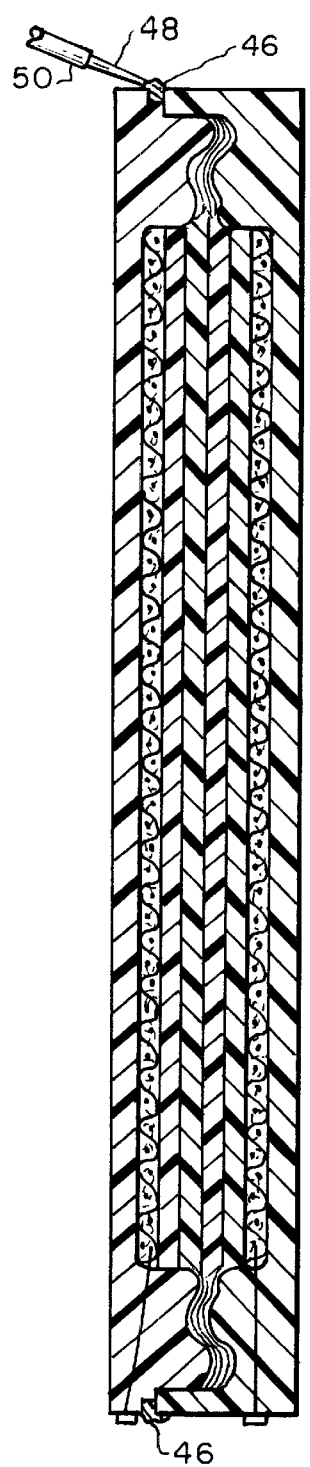
FIG. 4 is a view in section illustrating injecting a sealant into a peripheral recess.
Figure 5:
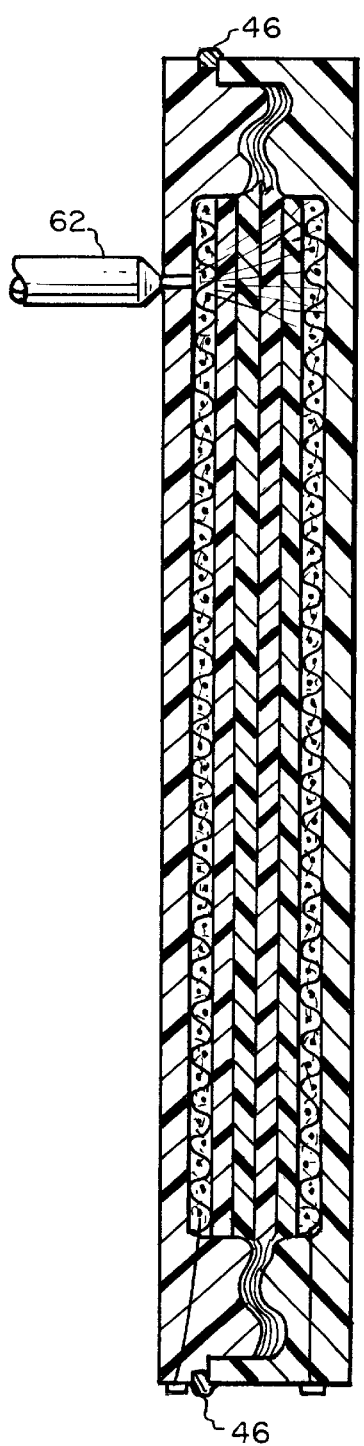
FIG. 5 is a view in section illustrating injecting electrolyte into the battery case.

A recess 40 can be formed at the juncture 42 of the lip 44 of the rim 36 and the stop or limit surface 43 of the groove 38. As shown in FIG. 4, the recess can be filled with a sealant 46 such as epoxy from a tip 48 of an application device 50. An anode terminal 54 can be connected to the anode screen current collector 56. A cathode terminal 58 can be connected to the cathode screen current collector 60. Electrolyte can be injected through the case from a device 62 as shown in FIG. 5. The aperture through the case is then sealed.

Figure 6:
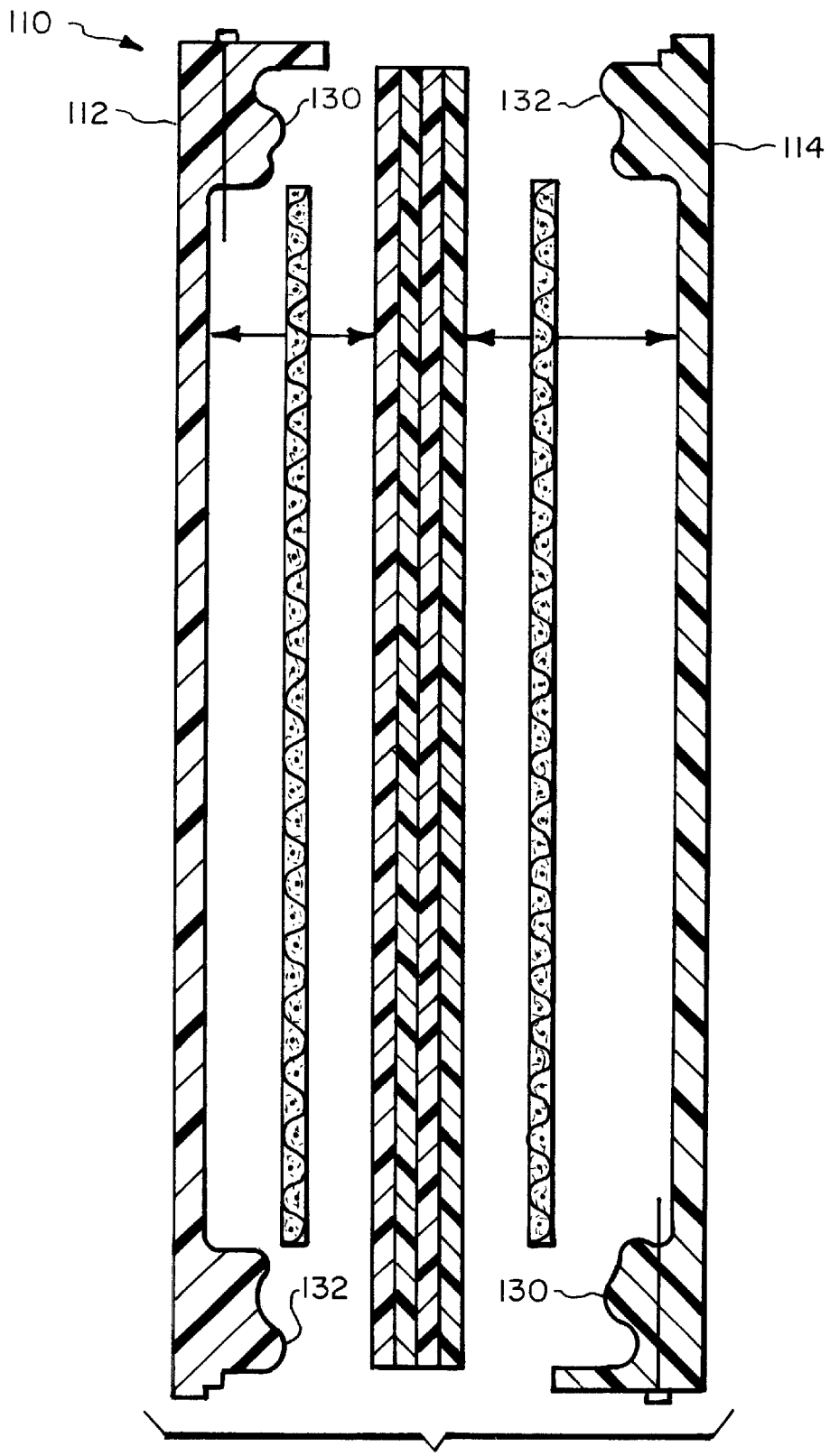
FIG. 6 is an exploded, cross-section view of an alternative embodiment of the case and battery components.

In the alternate embodiment of a battery 110 shown in FIG. 6, only one configuration is required for the case members 112 and 114. The case members are mirror images of each other such that 180 degree rotation results in the concave undulating surface 130 always faces a mating concave undulating surface 132.

The case material may be made of any injection-moldable thermoplastic resin material, including, but not limited to, polypropylene, ABS, ethyl cellulose. The edges of such plastic are machined or injection molded to produce the profile shown in the drawings. The top and bottom edges are undulating and designed to match, with a protrusion on one side being met with a depression on the other side. At least two undulations are necessary for the invention. The undulations should be smooth to avoid tearing the separators.

The battery may be assembled as follows. Anode paste is uniformly deposited on one side of the case. A similar process occurs for the cathode paste on the other side of the case. The two opposing faces are brought together as shown with a separator or separators in between. The total dry thickness for separator or separators should measure at least 80% of the spacing provided by simply juxtaposed opposing faces. The edges around the battery are sealed with any techniques known to those skilled in the art of sealing plastics. These techniques include solvent bonding, sealing with commercial filler adhesives, thermal bonding, hot plate welding or ultrasonic welding. One might expect the latter technique to shear the compressed separators as the mating surfaces vibrate and heat up at the interface. Such shearing is avoided in the assembly process of the invention by sealing the case while the separators are dry. The separators thus have spatial leeway and are not sheared. Upon exposure to electrolyte, the separators can then swell to fill the available channel space. An alkali hydroxide, preferably, but not limited to, potassium hydroxide of specific gravity in the range 1.25 to 1.45, is introduced into the sealed battery via any of known methods, including vacuum filling or electrolyte injection.

It is to be realized that only preferred embodiments of the invention have been described and that numerous substitutions, modifications and alterations are permissible without departing from the spirit and scope of the invention as defined in the following claims.

What is claimed is:

1. A battery case comprising in combination:
    a first hollow case member having a back wall and side walls terminating in a first peripheral edge, having a first profile;
    a second hollow case member having a back wall and side walls terminating in a second peripheral edge having a second profile mating with the first profile;
    an inner portion of the first profile containing at least two convex undulations;
    an opposed inner portion of the second profile containing at least 2 mating concave grooves; and
    means on said members for fixedly spacing the opposed portions a predetermined amount to form a separator gripping channel adapted to receive edges of swellable separators.

2. A battery case according to claim 1 in which the undulations and opposing grooves are rounded.

3. A battery case according to claim 2 in which the channel has an outer opening and further including means for sealing the opening.

4. A battery case according to claim 3 in which the spacing means includes a rim on the outer portion of one of said members having a length extending over said opening and a mating groove on the opposed outer portion of the other of said members having a length shorter than the length of the rim by said predetermined amount forming said spacing means.

5. A battery case according to claim 4 further including means for sealing the outer juncture of said rim and said groove.

6. A battery case according to claim 5 in which the sealing means includes solvent bonding, adhesive bonding, hot plate welding and ultrasonic welding.

7. A battery case according to claim 6 in which said other case member contains a recess for receiving a sealant at the outer juncture of the rim and groove.

8. A battery case according to claim 3 in which the spacing is selected so that the separators when dry occupy at least 80% but no more than 98% of the spacing.

9. A battery case according to claim 8 in which the spacing is from 90–95% of the thickness of dry separators.

10. A battery comprising in combination;
a sealed battery case as defined in claim 1 containing a zinc anode, a silver cathode and aqueous alkaline electrolyte and a stack of from 2–10 cellulose separators.

11. A method of assembling a battery comprising the steps of:
placing an anode in a cavity of a first rigid battery case member;
placing an cathode in a cavity of a second rigid case member;
placing a stack of swellable separators having a length and width larger than the cavities between the anode and cathode;
closing the case such that undulations and opposed grooves on the mating edges of the edges of the case members form a space at least as large as the thickness of the stack of dry separators and grip the outer portions of the separators;
sealing the case; and
adding liquid electrolyte to the separators such that the outer portions of the separators swell within said space.

12. A method according to claim 11 in which the separators comprise cellulose.

13. A method according to claim 12 in which the anode contains zinc, the cathode contains silver and the electrolyte is aqueous alkaline.

* * * * *